United States Patent
Denisart et al.

(10) Patent No.: US 9,386,876 B2
(45) Date of Patent: Jul. 12, 2016

(54) DEVICE FOR ADAPTING A FOOD CAPSULE INTO A CAPSULE HOLDER

(75) Inventors: Jean-Luc Denisart, Cully (CH); Nihan Dogan, La Croix-sur-Lutry (CH); Frédéric Doleac, Vaux et Chantegrue (FR); Stéphane Hentzel, Yvonand (CH); Marc Raederer, Le Mont-sur-Lausanne (CH)

(73) Assignee: Nestec S.A., Vevey (CH)

( * ) Notice: Subject to any disclaimer, the term of this patent is extended or adjusted under 35 U.S.C. 154(b) by 273 days.

(21) Appl. No.: 13/808,050

(22) PCT Filed: Jun. 30, 2011

(86) PCT No.: PCT/EP2011/061029
§ 371 (c)(1),
(2), (4) Date: Jan. 2, 2013

(87) PCT Pub. No.: WO2012/001115
PCT Pub. Date: Jan. 5, 2012

(65) Prior Publication Data
US 2013/0133522 A1    May 30, 2013

(30) Foreign Application Priority Data
Jul. 1, 2010  (EP) .................................... 10168128

(51) Int. Cl.
*A47J 31/06* (2006.01)
*B65B 29/02* (2006.01)

(52) U.S. Cl.
CPC .......... *A47J 31/0642* (2013.01); *A47J 31/0647* (2013.01); *A47J 31/0668* (2013.01)

(58) Field of Classification Search
CPC   A47J 31/0642; A47J 31/0647; A47J 31/0668
USPC ........... 99/295, 300, 301, 323, 323.3; 426/77, 426/590, 594–598, 431–435
See application file for complete search history.

(56) References Cited

U.S. PATENT DOCUMENTS 3,975,996 A * 8/1976 Vitous ............................ 99/295
5,398,595 A    3/1995 Fond et al.
(Continued)

FOREIGN PATENT DOCUMENTS

| DE | 202004008637 U1 | 9/2004 | |
| DE | 102007038699 A1 | 2/2009 | |
| EP | 0521186 A1 | 7/1991 | |
| EP | 1774879 A1 * | 4/2007 | .............. A47J 31/06 |
| WO | 97/43937 | 11/1997 | |
| WO | WO 9743937 A1 * | 11/1997 | .............. A47J 31/06 |
| WO | 2004/105564 A1 | 12/2004 | |
| WO | 2006/066621 A1 | 6/2006 | |

OTHER PUBLICATIONS

International Search Report and Written Opinion issued Oct. 14, 2011 for Intl. Appln. No. PCT/EP2011/061029.
Mexican Office Action for Application No. MX/a/2013/000177, dated Mar. 19, 2015, 4 pages.

*Primary Examiner* — Dana Ross
*Assistant Examiner* — Ket D Dang
(74) *Attorney, Agent, or Firm* — K&L Gates LLP (57) ABSTRACT

An adapting device for adapting a capsule into the capsule holder of a food machine when the capsule or pod is smaller than capsules or pods originally designed for insertion into the capsule holder is provided. The machine includes a fluid injection element for circulating a fluid through the capsule to a discharge opening, the capsule including a body enclosing a food ingredient to be dissolved and/or extracted so as to produce a food product, and further including circumferential edges. The device includes a holding portion for holding at least a portion of the capsule, and a sealer for circumferentially adapting to the capsule holder and/or to the fluid injection element, and/or to the capsule outside surface, in a leak-tight manner so that the fluid flow is directed solely from the fluid injection element through the capsule, to a discharge opening.

14 Claims, 5 Drawing Sheets

(56) References Cited

U.S. PATENT DOCUMENTS

| | | | | |
|---|---|---|---|---|
| 5,472,719 A | * | 12/1995 | Favre | A47J 31/0673 426/112 |
| 6,805,041 B2 | | 10/2004 | Colston et al. | |
| 8,302,528 B2 | * | 11/2012 | Pawlick et al. | 99/448 |
| 2004/0005384 A1 | * | 1/2004 | Cai | 426/77 |
| 2006/0174769 A1 | * | 8/2006 | Favre et al. | 99/275 |
| 2007/0039476 A1 | | 2/2007 | Kodden | |
| 2007/0039479 A1 | * | 2/2007 | Dalton | A47J 31/0684 99/279 |
| 2008/0245236 A1 | * | 10/2008 | Ternite et al. | 99/295 |

\* cited by examiner

DEVICE FOR ADAPTING A FOOD CAPSULE INTO A CAPSULE HOLDER

CROSS REFERENCE TO RELATED APPLICATIONS

The present application is a National Stage of International Application No. PCT/EP2011/061029, filed on Jun. 30, 2011, which claims priority to European Patent Application No. 10168128.6, filed Jul. 1, 2010, the entire contents of which are being incorporated herein by reference.

FIELD OF THE INVENTION

The present invention relates to a device for adapting a food container such as a capsule or pod, into a holding device such as those used in food preparation devices like coffee brewing machines.

BACKGROUND OF THE INVENTION

Many machines both for household and professional use are known that allow a consumer to prepare foods or drinks out of capsules or pods containing the ingredients thereof. The way the capsule or pod is inserted into the food preparation machine is key for accessibility of the system, and consumer convenience. More particularly, the capsule or pod insertion should preferably be direct and simple, and allow proper and easy removal of the used capsule or pod.

Each one of the suppliers of the systems using capsules has developed its own specific shape and size for the capsules or pods and the machine holder that goes therewith. Typically, capsules have a thicker configuration, with a shape that is generally frustoconical.

The generic principle of food preparation from a capsule comprises, after insertion of the capsule into a receptacle of the machine, the injection or diffusion of a fluid—hot or cold water for instance—into the capsule. The said fluid will extract (using a fluid pressure build-up inside the capsule) and/or dissolve (low or no pressure inside capsule) at least one food product contained in the capsule, so as to prepare the end food product that will then flow out of the capsule, into a cup.

Due to the fact that food preparation machines use a flow of fluid to prepare a food product from the capsule, it is essential to guarantee fluid-tightness between the capsule and the machine. Additionally, some machines allow the preparation of a whole range of different products, depending on which ingredient is initially packed into a capsule. Hence, the possibility to prepare with the same machine for instance an espresso coffee by insertion of a coffee capsule or pod into the machine, and immediately afterwards, a chocolate cup by insertion of a chocolate capsule. In such cases however, it is important to guarantee that no-cross contamination occurs between two different products prepared one after the other. It is also important to guarantee that the machine is not in contact with the dispensed product so that no product stays after dispensing, avoiding risks of microorganisms development in the machine, which is of course undesirable for the consumer.

For the aforementioned reasons, some systems include a capsule or pod holder, which is built-in and movable, or is detachable relative to the machine, so that a capsule can be directly inserted, and then removed once it is used.

An additional important technical characteristic of the capsule holder is that its shape and size is adapted to tightly fit the size and shape of a corresponding capsule, in order to guarantee that the capsule will not be damaged or explode under the effect of internal pressure, when the food preparation involves a pressure build-up of the injection fluid inside the said capsule during the preparation process.

In some cases however, a consumer could be tempted to use the machine for the preparation of a product that is not proposed in the range of products of the capsules or pods that usually fit the machine.

There is therefore a need for allowing a flexibility of the machines using a capsule holder, so that a machine developed for the use with a certain type of capsules or pods can also be used with other capsules, while guaranteeing the same level of safety, food product quality and convenience, as the native system of capsules or pods.

SUMMARY OF THE INVENTION

The present invention solves the above mentioned technical problem with a food preparation machine for preparing a food product out of a capsule or pod, said machine being adapted to receive a capsule or pod holder which is configured to receive and hold at least one capsule or pod of a first kind, and comprising a fluid injection element which can be moved relative to the capsule or pod holder, for circulating a fluid through the capsule or pod internal chamber to a discharge opening of said capsule or pod, characterized in that said machine further comprises at least one adapting device for adapting at least one capsule or pod of a second kind into the capsule holder, said capsules or pods of the second kind being smaller than said capsules or pods of the first kind, said device comprising:

a holding portion for holding at least a portion of said capsule or pod of the second kind, wherein the holding portion contacts and holds the entire surface of the capsule or pod side walls—and also preferably bottom walls—, at least at the time the fluid circulates through said capsule or pod, and     sealing means for circumferentially adapting to the capsule holder and/or to the fluid injection element, and/or to the capsule outside surface, in a leak-tight manner so that the fluid flow is directed solely from the fluid injection element through the capsule or pod internal chamber, to the discharge opening of said capsule or pod.

The present invention allows a consumer to use a different kind of capsules or pods, than the kind of capsules or pods natively (i.e. initially) developed for use with the beverage preparation machine and its capsule holder, whatever this machine and holder, when these different capsules or pods are smaller than the capsules or pods originally designed to function with the machine and its capsule holder.

The holding portion of the adapting device contacts and holds the entire surface of the capsule or pod body, at least at the time the fluid circulates through said capsule or pod. In such a way, the invention solves the problem of high pressure generated within the capsule or pod: due to the high pressure inside the capsule or pod during the food preparation, the capsule walls must be held against the internal walls of the capsule holder. In case a user uses a different type of capsule or pod, i.e. a capsule or pod having a different size and/or shape such that the said capsule or pod is smaller in volume than the capsule or pod natively developed for use with the capsule or pod of the machine, then the walls of said "non-native" capsule or pod will not be held against the capsule holder's internal walls as it should normally be. As a result, there is a risk of explosion or damage to the capsule or pod, as a result of the pressure build-up during preparation. As it can be now understood, the present invention solves this issue by proposing a food preparation machine comprising an adapting device which can be used by the consumer to prevent damage to a different kind of capsule or pod than the kind of capsule or pod which had initially be developed to adapt to the capsule holder of the said machine. Such damage is prevented by the capsule holder being adapted in shape and size to the non-native capsule or pod, such that the internal walls of the adapting device hold the external surface of said non-native capsule or pod while liquid is injected under pressure in said capsule/pod.

Furthermore, such a configuration is essential to guarantee that no fluid will flow in short-circuit flowpaths, more particularly to guarantee that no leaking will occur in the space between the adapting device and the capsule holder, and/or between the adapting device and the injection element, and/or between the adapting device and the external surface of the capsule or pod body walls. The fluid is therefore "forced" to flow from the injection element of the machine, through the capsule or pod, and then out of the capsule holder, for instance to a cup disposed below.

Furthermore, the present invention more directly concerns an adapting device for adapting at least one so-called "non-native" capsule or pod into the capsule holder of a food preparation machine as described above, wherein said non-native capsule or pod is smaller than so-called "native" capsules or pods originally designed for insertion into said capsule holder, said adapting device comprising:

- a holding portion for holding at least a portion of said capsule or pod, wherein the holding portion contacts and holds the entire surface of the capsule or pod side walls—and also preferably bottom walls—, at least at the time a fluid circulates through said capsule or pod under pressure, and
- sealing means for circumferentially adapting to the capsule holder and/or to the fluid injection element of the machine, and/or to the capsule outside surface, in a leak-tight manner so that the fluid flow is directed solely from the fluid injection element through the capsule or pod internal chamber, to a discharge opening of said capsule or pod.

In a first embodiment, the adapting device comprises a ring-like device body, whose external shape and size are adapted to fit at least partially the internal shape and size of the capsule holder, and whose internal shape and size are adapted to fit at least partially the external surface of at least one capsule or pod.

In a second alternative embodiment, the adapting device comprises a generally cup-like device body, whose external shape and size are adapted to fit at least partially the internal shape and size of the capsule holder, and whose internal shape and size are adapted to fit at least partially the external surface of at least one capsule or pod, said cup-like body comprising at least one outlet opening in its lower portion for circulating the food product produced from the circulation of the fluid through said capsule or pod.

Generally, the adapting device according to the present invention, further comprises a closing lid wall for closing the cup-like, or ring-like device body, said lid comprising an opening disposed in correspondence to the fluid injection element, so as to let said fluid through said lid into the capsule or pod.

In such a case, the lid preferably comprises a duct system comprising at least one duct in fluid communication with the lid opening, said at least one duct being in fluid communication with at least one outlet opening disposed in the vicinity of, or in contact with, the capsule or pod body.

Even more preferably, the closing lid further comprises sealing means, for instance a circular O-ring rubber seal, to ensure that the contact surface between the device body and said lid is leak-tight. Alternatively, both parts can be made of, or coated with, a rubber-like material that ensures a leak-tight interface there between.

The shape and size of the lid may vary depending on the type of capsule or pod that is used.

The internal shape of the adapting device can be adapted to enclose a capsule having substantially rigid walls with a generally cylindrical, discoid, or frustoconical shape. Alternatively, the internal shape of the said adapting device can be adapted to enclose a soft pod having substantially flexible walls with a generally discoid shape.

In another possible alternative embodiment of the present invention, the adapting device comprises two cup-like complementary shells adapted to engage in a leak-tight manner so as to define together an internal chamber for enclosing at least one capsule or pod, the upper shell being connected to the fluid injection element in a fluid-tight manner, and the lower shell comprising an outlet opening for circulating the food product produced from the circulation of the fluid through said capsule or pod.

In all cases mentioned above, the adapting device advantageously comprises a lower portion in the shape of a hopper, said hopper having a shape and size such that the hopper lower outlet opening fits within the capsule holder lower dispensing opening, so that the food product flowing from the capsule or pod is directed through the hopper, out of the said hopper, without contacting said capsule holder. Such a configuration prevents cross-contamination between two different products that would be prepared one after the other, provided that the adapting device is cleaned after each beverage preparation. In such a case, the prepared product does not contact the machine or capsule holder, which is of course highly convenient to the consumer: fewer parts in the system need to be cleaned after usage.

Also preferably, the adapting device according to the invention further comprises opening means disposed on at least a portion of its inner surface, said opening means being suitable for opening at least a portion of the capsule or pod so as to create at least one fluid inlet and/or product dispensing outlet opening through said capsule or pod.

Advantageously, the adapting device according to the invention can be made such that it is single-use and disposable. This removes the need for a cleaning of the said device after each use and is highly consumer-friendly. In such a case, the different constitutive parts of the device are preferably manufactured out of a biodegradable or compostable material.

The present invention is further directed to providing a method for allowing a user to prepare a food product from a system as described above, said method comprising the steps of:

- disposing an adapting device according to the present invention, into the capsule holder of a food preparation machine,
- loading said adapting device with at least one capsule or pod,
- optionally closing the said adapting device with a top lid,
- optionally placing the loaded capsule holder into a receptacle of the machine,
- starting a food preparation cycle by automatic or manual actuation of the machine.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

In the rest of the detailed description, in order to simplify, it will be assumed that the food preparation machine is a beverage preparation machine. However, this should not be considered as limiting the scope of the present application or claims. Other types of machines would benefit from the present invention, such as for instance nutritional food preparation machines, ice cream machines, tea machines, or coffee machines.

Such machines are well known in the art and are for instance described in European patent EP1967099B1. They typically comprise:
- a source of extraction fluid, e.g. water, for extracting and/or solubilising the ingredient contained in a capsule so as to prepare a food product; such a source can be a water reservoir for instance,
- a capsule holder for placing and holding the capsule into the machine in a proper position during the preparation of the food product, said capsule holder being detachable completely, or simply movable relative to the machine,
- a fluid injection element for circulating the extraction fluid into the capsule; circulating should not be understood as limiting in the present invention, and can comprise the direct injection of fluid into the capsule chamber by means of an injection needle for instance, but alternatively also comprise the diffusion of fluid through the capsule by creating a bed of fluid onto one portion of the capsule walls, so that the fluid flow is directed solely through the capsule chamber, and does not circulate along a "short-cut" path around the capsule; the fluid circulating into the capsule or pod can be under pressure, or at ambient pressure; in case it is pressurized, the working pressure can be low (typically below 10 bar) or high (above 10 bar);
- pump means for circulating the extraction fluid from the source through the machine, to a fluid injection element that will circulate the fluid through the capsule or pod
- heating means in fluid communication with the pump and the injection element, for heating the fluid if necessary, before circulating it through the capsule,
- valve means associated to a manual selector, so that the fluid circulated through the capsule or pod can be heated or left at ambient temperature, depending on the type of product that is prepared.

To operate the machine, the consumer generally inserts a capsule or pod into the capsule holder, and then inserts the loaded capsule holder into a receptacle of the machine. The fluid injection element and the capsule holder are then moved manually by the consumer towards one another, so that the injection element is put in contact with the capsule, ready for injection of the fluid into the capsule or pod.

Alternatively, at least part of the movement of the capsule holder inside the machine can be automated so as to ensure that the fluid injection element be put in contact with the surface of the capsule or pod.

The adapting device according to the invention aims at providing a safe and convenient solution for the consumer who wishes to use a capsule or pod into the capsule holder of a food preparation machine, which would be a non-native capsule or pod for use with the beverage preparation machine. By "non-native" it is meant a capsule or pod which was not initially designed for use in a capsule holder of the beverage preparation machine, and is smaller than the native capsule or pod initially designed for use with the capsule holder of the machine. In other words, the non-native capsule or pod has a volume which is smaller than the internal volume of the capsule holder. More precisely, such a non-native capsule has a shape and/or size which differs from that of the capsules or pods initially designed for adapting into the capsule holder of the beverage preparation machine. In such cases, the non-native capsule or pod which was not designed and structured to be used into the capsule holder of the food preparation machine, can anyhow contain a type of food ingredient for the preparation of a food product that fits the consumer's needs. However, such a non-native capsule or pod has a volume which is inferior to that of the native capsules or pods, such that at least a portion of the external surface of said capsule or pod is not in contact and held by the internal walls of the capsule holder during the preparation of a beverage, i.e. while liquid is injected under pressure inside the said capsule or pod. The fact that the capsule or pod walls are not, or only partially, held while the said capsule or pod withstands a pressure, can lead to damage or explosion of the said capsule or pod during preparation of a beverage, which is of course highly undesirable.

A so-called "native" capsule, i.e. specifically designed for use in a capsule holder of a beverage preparation machine as described in the present application, can have any shape and size, as long as this shape and size are such that the external surface of the capsule or pod walls—at least the side and bottom walls—adapt to the internal surface of the capsule holder, so that said internal surface walls of the capsule holder hold tightly the side and bottom walls of the capsule, at least while liquid is injected therein, but preferably at any time when said capsule (or pod) is inserted into said capsule (or pod) holder.

In the rest of the description also, specific capsule or pod designs will be described as non limiting examples of capsules or pods that can be used in a device as per the invention.

For example, a suitable capsule could be of the "open" type, i.e. already open on one side that is meant to be disposed on the side of the fluid injection element of the machine (extraction fluid inlet opening), and/or on bottom (food dispensing opening, or "outlet" opening).

In another example, the capsule is closed at the time it is inserted into the adapting device and capsule holder, and opens when internal pressure builds-up with the extraction fluid injected thereinto, and pressing outwardly onto the capsule walls. More particularly, it can be for instance a capsule with top and/or bottom membrane having means to open capsule when subject to a fluid pressure, e.g. a self-opening valve.

In yet another embodiment, the capsule or pod is closed—at least at the top or the bottom side, while its lateral walls are also closed—at the time it is inserted into the machine, and it is open by contact with an opening means that is a constitutive element of the adapting device.

Figure 1:
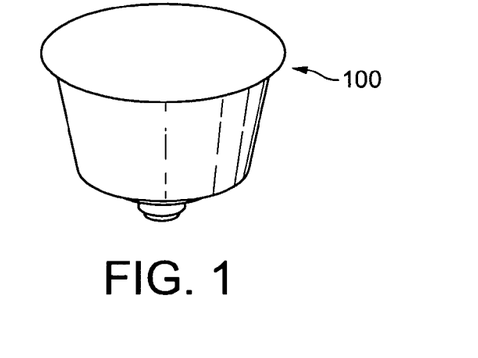
FIG. 1 is a perspective view of a rigid capsule natively developed for use with a capsule holder of a machine according to the present invention.
Figure 2:
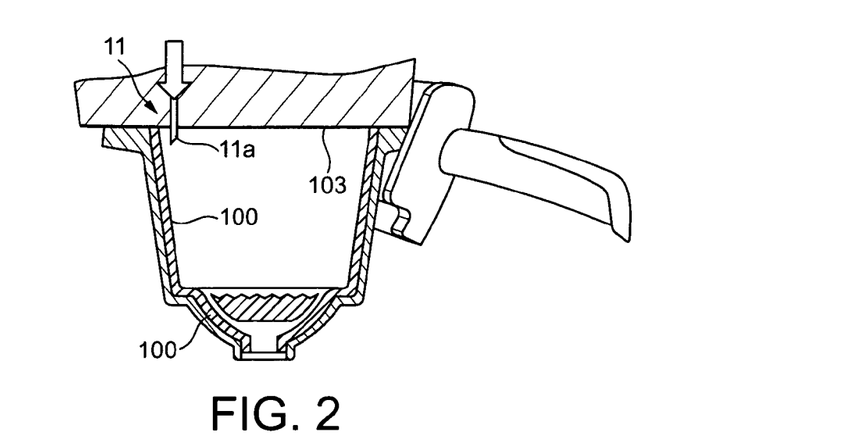
FIG. 2 is a profile view of a rigid capsule according to FIG. 1, in place in the capsule holder of the machine according to the present invention.

FIG. 1 shows a native capsule 100 to be used in a capsule holder of a beverage preparation machine according to the invention. FIG. 2 shows a native capsule 100 as illustrated in FIG. 1, hence specifically designed to fit into the capsule holder 7 of the beverage preparation machine, positioned into the capsule holder of the latter. As it is a native capsule, by definition, its shape fits properly the shape of the capsule holder 7 such that the external surface of the capsule side and bottom walls fit the internal surface of the capsule holder. Furthermore, FIG. 2 illustrates how the top membrane 103 of said native capsule lies against the needle plate of the fluid injection element 11, such that the needle 11a protrudes inside the capsule, in the functional configuration of the capsule inside the capsule holder.

A few possible and specific embodiments of the adapting device according to the invention will now be given as examples, and further illustrated by the drawings.

Figure 3A:
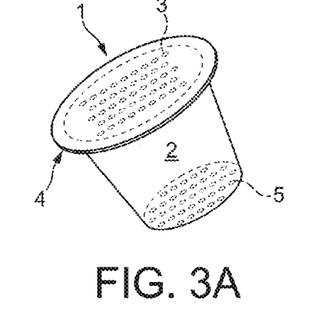
FIG. 3A is a perspective view of a rigid capsule of a different kind than the native capsule illustrated in FIG. 1.

In a first embodiment of the present invention, illustrated in FIG. 3A, the adapting device can adapt a capsule 1 with a capsule body 2 having rigid walls, made for instance of aluminium or injected plastic, or a combination thereof. The capsule 1 has generally frustoconical walls, and its top wall 3 comprises a circumferential edge 4.

The rigid or semi-rigid capsule illustrated in FIG. 3A is of the open type: its top wall 3 and bottom wall 5 are both open at the time the capsule 1 is disposed into a capsule holder or adapting device. During storage, the open capsule is packed in a secondary package, for instance a flexible film overwrap—not shown in the drawing—.

Figure 3B:
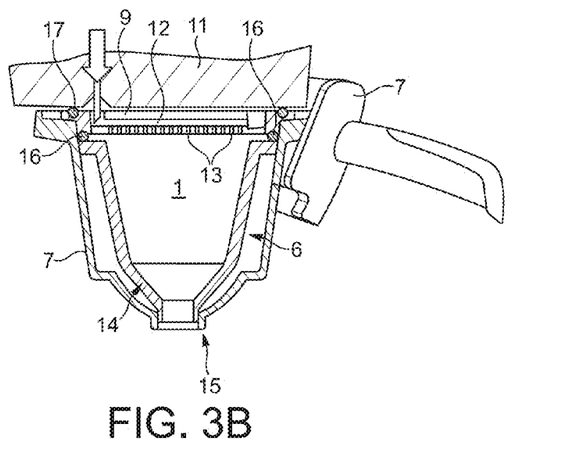
FIG. 3B is a profile cut view wherein the non-native capsule of FIG. 3A and the adapting device according to the invention are fitted into a capsule holder, in order for food preparation.

In FIG. 3B is shown an adapting device 6 according to the invention, which is disposed into the capsule holder 7 of a beverage preparation machine. The adapting device comprises a cup-like body 8, and a top lid 9. As can be seen in the drawing, when the lid 9 closes the body 8, the adapting device 6 encloses completely the capsule 1, and holds the capsule side walls as well as the capsule top wall 3, which is adjacent the top lid 9 of the adapting device 6. Alternatively, the dimensions of the adapting device could be set so that a headspace would appear between the lower surface of the top lid 9 and the upper surface of the capsule top wall 3. Such a headspace will be described later with reference to FIG. 3.

The top lid 9 comprises an opening 10 disposed in correspondence to a fluid injection element 11 of the beverage preparation machine, so as to let said fluid through said lid into the capsule. In FIG. 3B, the fluid injection element is an injection needle 11 supported by a needle plate, and the fluid intake is represented with an arrow. The top lid 9 comprises a duct system 12 with one duct in fluid communication with the lid opening 10, said duct 12 being also in fluid communication with a plurality of outlet openings 13 disposed in the vicinity of the capsule top wall 3. During the beverage preparation, fluid comes in through the injection needle 11; it then circulates through the circulation duct 12, and enters the inside of the adapting device 6 through the outlet openings 13. At that time, as fluid is pumped by the beverage preparation machine, it flows through the capsule, thus extracting and/or dissolving the capsule contents, so as to prepare a beverage. The said beverage is then dispensed through the openings of the capsule bottom wall 5, toward a hopper-shaped portion 14 of the adapting device so as to direct the beverage towards the output opening 15 of the capsule holder 7. As illustrated in FIG. 3B, the hopper portion 14 of the adapting device 6 is preferably shaped with a protruding part at its lower bottom side, such that the hopper lower outlet opening fits within the capsule holder lower dispensing opening 15, so that the food product flowing from the capsule or pod is directed through the hopper, out of the said hopper, without contacting said capsule holder.

The adapting device according to the invention has a mechanical resistance sufficient to withstand the internal pressure that is present inside the capsule or pod which is inserted therein, such that it holds at least the side and bottom walls of said capsule or pod during the preparation of a beverage, i.e. when liquid is introduced under pressure into said capsule or pod.

As illustrated in FIG. 3B, the closing top lid 9 further comprises sealing means to ensure that the contact surface between said cup-like device body and said lid is leak-tight. Said sealing means comprise a circular O-ring rubber seal 16.

Additionally, in order to ensure that the interface between the top surface of the lid 9 and the rest of the beverage preparation machine is leak-tight, the lid 9 can comprise a circular sealing rubber seal 17.

Alternatively to the O-ring seal means described above, the sealing and leak-tightness can be achieved with a rubber-like coating and/or a specific shape of the lid 9 and/or body 8, to ensure that these parts tightly and seamlessly fit the corresponding adjacent parts they are in contact with.

Figure 4:
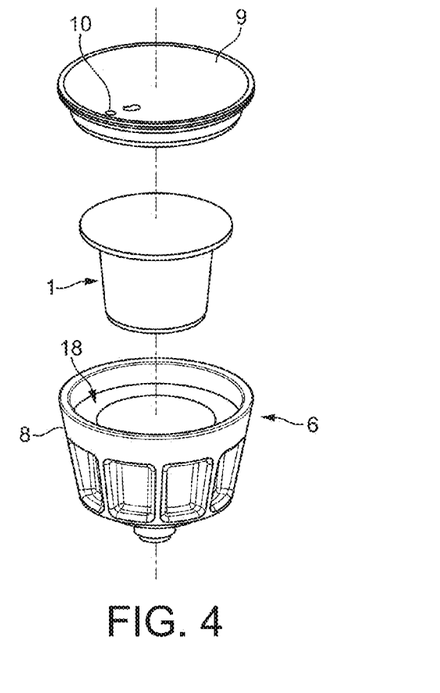
FIG. 4 is a perspective split view showing a capsule similar to the one shown in FIG. 1A, which is arranged in an adapting device similar to FIG. 3B.
Figure 5:
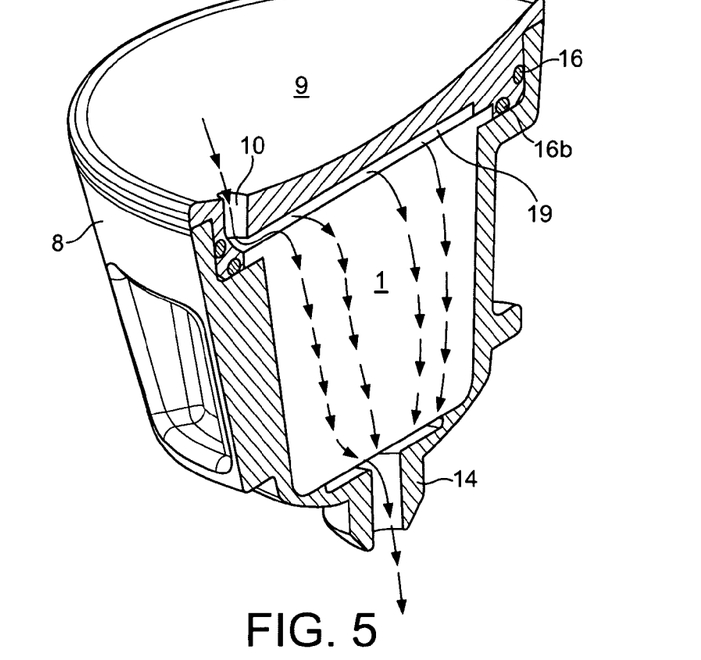
FIG. 5 is a perspective cut view similar to FIG. 4.
Figure 6:
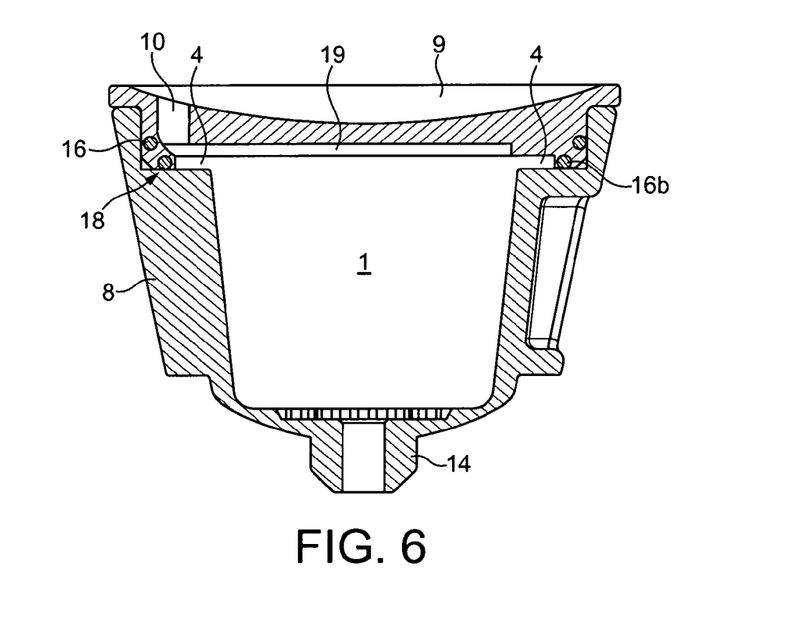
FIG. 6 is a profile cut view similar to FIG. 5.

FIG. 4 illustrates in detail how the capsule 1 is placed in the cup-like body 8 of the adapting device, and how the top lid 9 of the adapting device then closes the said body so that the interface between said lid 9 and said body 8 is leak-tight. Once seamlessly adapted onto the body 9, the sole possible passage for a fluid is through the top lid opening 10, then through the capsule 1, then out through the hopper shaped portion 14 of the adapting device as illustrated with a series of arrows in FIG. 5. As shown in FIG. 4, the cup-like body 8 comprises an internal edge portion 18 that is circumferentially disposed at the upper part of the said body 8. This edge portion 18 is meant to adapt exactly to the capsule circumferential edge 4, as can be also observed in FIG. 5 or FIG. 6. The fact that the capsule edge 4 rests onto, and adapts exactly to the circumferential edge portion 18, ensures that the fluid injected into the headspace portion 19 is directed inside the capsule body, and does not run through a shortcut path outwardly around the capsule edge and along the external surface of the capsule body walls. Such a shortcut path is highly undesirable as it would diminish the extraction and/or dissolution of the capsule contents by said fluid, and would lead to a poor quality of the final product. Possibly, an additional sealing means such as an O-ring 16b can be adapted to reinforce the leak-tightness in the region of the interface between the capsule edge, the top lid 9 and capsule body 8, as illustrated in FIGS. 5 and 6.

Figure 7:
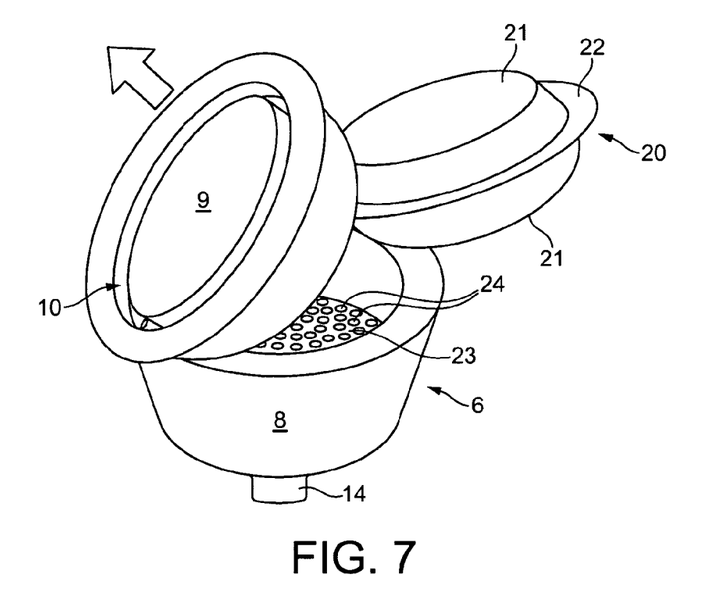
FIG. 7 is a schematic perspective view showing another embodiment of an adapting device wherein a soft pod is being inserted.
Figure 8:
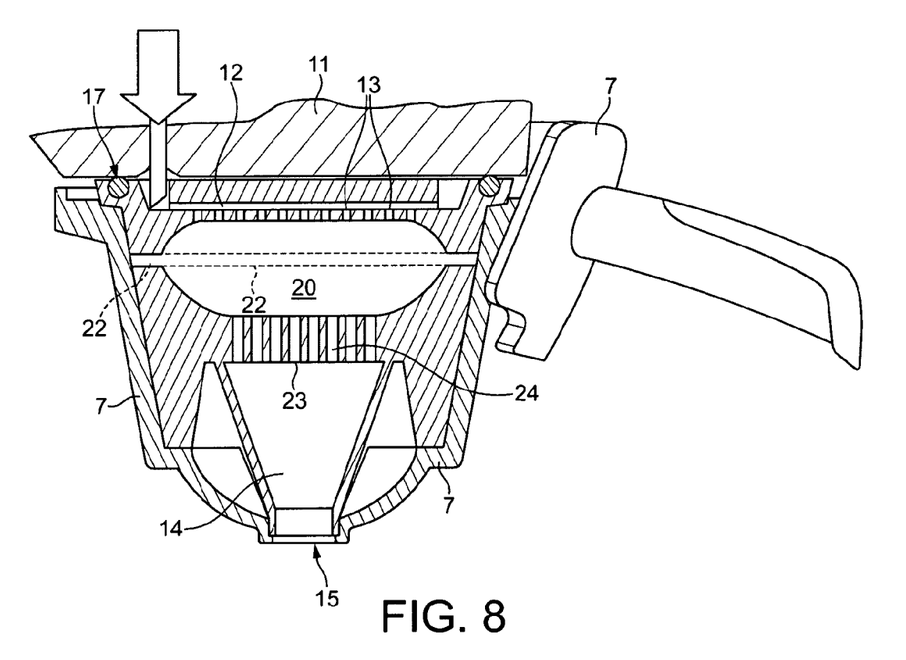
FIG. 8 is a profile cut view similar to FIG. 5, wherein the pod and insert are fitted into a capsule holder, in order for food preparation.

FIG. 7 illustrates an alternative embodiment of an adapting device 6 according to the present invention. In this case, the adapting device body 8 is meant to receive a soft pod 20, for instance a disc-shaped coffee pod made out of two layers 21 of soft filter paper which enclose an amount of powdered roast and ground coffee, the two layers being sealed around a peripheral edge 22 of the disc-shaped pod 20. As illustrated in FIG. 7, the cup-shaped body 8 of the adapting device 6 comprises a bottom wall 23 that is pierced with a plurality of outlet holes 24. The external top surface of the top lid 9 comprises a circular groove that is meant to accommodate the fluid injection needle 11 of the beverage preparation machine, as can be seen in FIG. 8. Sealing means, such as for example an O-ring rubber seal 17, is provided as already described in detail above, in order to prevent leakage between the top lid 9 and the beverage preparation machine. If necessary, similar sealing means can be arranged at the interface between the adapting device body 8 and the peripheral edge 22 of the pod 20.

As shown in FIG. 8, once the pod is inserted into the adapting device, the latter encloses and holds perfectly the said pod, that is to say, the surfaces of the pod are in contact with the internal surface of the adapting device, at least at the time the fluid circulates through the said pod. In this case, the interface between the pod peripheral edges 22, the top lid 9, and the adapting device body 8 is leaktight, due to the fact that the constitutive material of the pod is a soft material, acting as sealing material, and also due to the fact that the top lid 9 and the body 8 are firmly pressed one onto the other so as to sandwich very tightly the edge 22 of the pod. In case however this construction would not prove to be sufficiently leaktight, especially if the food preparation requires a high fluid pressure passing through the pod, then the surfaces of the lid 9 and body 8 which are in contact with the pod edge 22 can be coated with a sealing material such as rubber.

Figure 9:
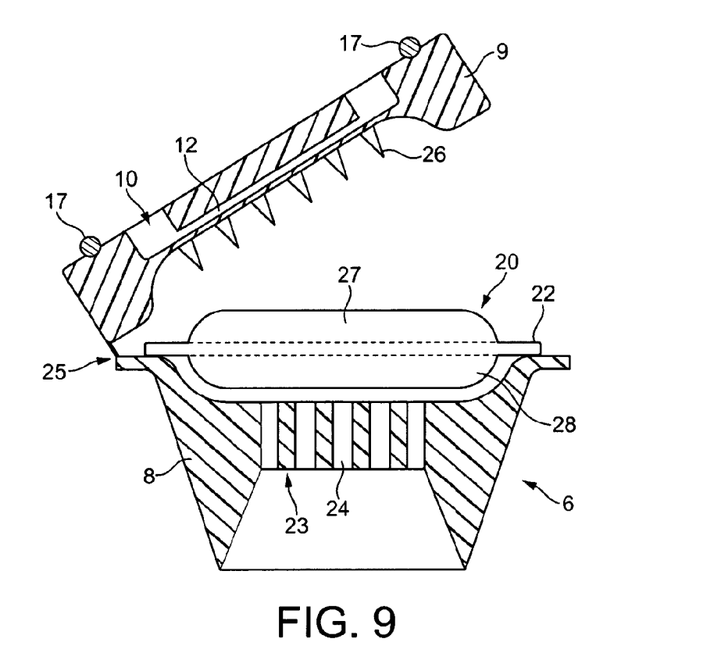
FIG. 9 is a schematic profile view of a third embodiment of the invention.

FIG. 9 illustrates another possible embodiment of an adapting device according to the invention. In this case, the top lid 9 of the adapting device 6 is pivotally attached to the body 8 around a pivot hinge 25. The embodiment illustrated in FIG. 9 further comprises a characteristic according to which the top lid 9 of the adapting device 6 comprises a series of hollow spikes or needles 26 extending downwardly towards the inside of the adapting device. These spikes 26 are connected to the duct system 12 of the top lid 9, and are therefore adapted to convey the injection fluid from the machine injection element towards the capsule. In particular, the spikes 26 are adapted in length to pierce the surface of a capsule or pod so as to enter directly inside the capsule or pod body, into the mass of ingredient contained therein. Such a construction is especially adapted to situations where the capsule or pod to be inserted in the adapting device has a rigid, closed, surface, at least on the side adjacent to the top lid 9. In the example shown in FIG. 9, the pod 20 is made of two halves joined along a peripheral edge 22. The upper half 27 of the pod is rigid and closed, while the lower half 28 is made of a soft filter paper that is permeable to liquid. The adapting device body is similar to the embodiment previously described in reference to FIG. 8, without a hopper portion.

Figure 10:
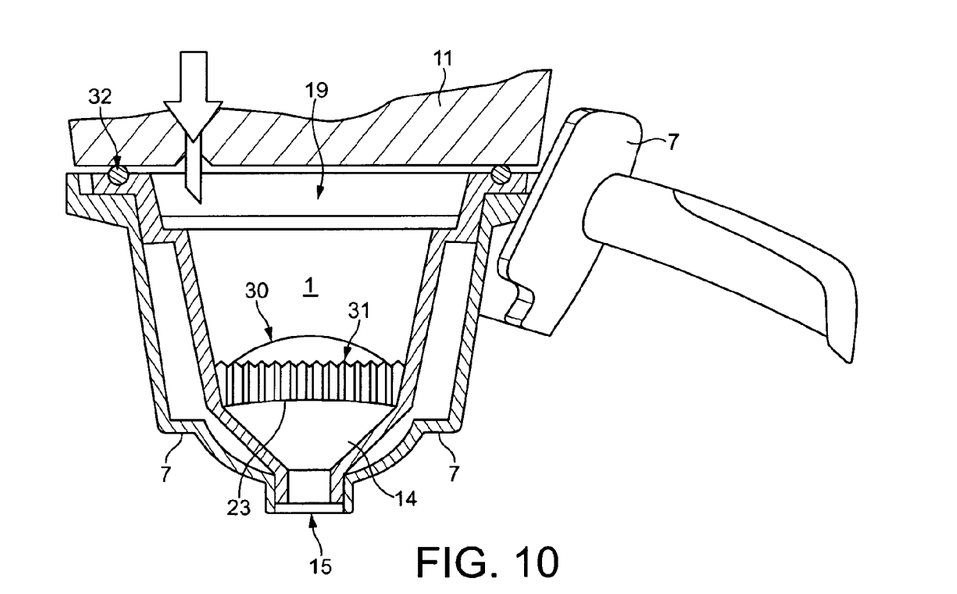
FIG. 10 is yet a schematic profile cut view showing a fourth embodiment of the invention.

FIG. 10 shows yet another possible embodiment of the invention, wherein the adapting device is constructed to receive a semi-rigid capsule having a top wall which comprises small inlet openings (not shown in the drawing). The capsule further comprises a flexible bottom wall 30 having a convex shape, oriented towards the inside of the capsule as shown in FIG. 10. The bottom wall 23 of the adapting device comprises a series of dispensing outlet holes 24 to let the product prepared from the capsule flow out. In this specific embodiment, the upper surface of the bottom wall 23 comprises a series of spikes 31 oriented upwardly towards the capsule bottom wall 30. In the embodiment illustrated in FIG. 10, the adapting device does not comprise a top lid, and the sealing between the upper edge of the adapting device and the needle plate of the fluid injection element 11 is achieved by an O-ring seal 32 which prevents leakage between these two elements.

When fluid passes through the needle of the fluid injection element 11, it enters the headspace 19 comprised between the needle plate and the top wall 29 of the capsule. It then flows through the capsule top wall openings, and enters the capsule. When the capsule is full of fluid, pressure builds up and starts to press outwardly onto the capsule walls, and particularly onto the bottom convex wall 30. When the pressure inside the capsule reaches a predetermined value, the bottom wall deforms and moves outwardly onto the spikes 31 of the bottom wall 23, which pierce the convex wall 30 of the capsule, thus allowing product contained inside the capsule to flow out through the adapting device's hopper shaped portion 14, and then through the output opening 15 of the capsule holder, into a cup (not shown in the drawing).

In another embodiment of the invention, not shown in the drawing, the top lid is detached from the adapting device body and said lid can be attached manually by the consumer onto the fluid injection element of the machine. In this case, attachment means are provided on the top lid of the adapting device, for instance a suction cup, a portion coated with releasable glue, or similar releasable or permanent attachment means.

During closing of the machine, the fluid injection element together with the top lid is moved onto the adapting device body and closes its upper edge in a leak-tight manner—sealing means as described above can be provided—.

As can be understood from the aforementioned explanations and descriptions, the present invention provides a very reliable and flexible solution for adapting capsules or pods which were not initially designed or structured to be used with a particular food preparation machine and its capsule holder. In this case, the adapting device allows to safely adapting one type of capsule or pod into the capsule holder, such that the quality of the final product is guaranteed, and safe operation of the machine is also guaranteed, particularly by preventing damage to the capsule or pod which was not initially shaped and/or sized to fit the capsule (or pod) holder, when internal pressure rises into said capsule or pod, also by preventing fluid leakage throughout the different elements associated altogether, and also by preventing that shortcut flowpath of the extraction/dissolution fluid is prevented.

The adapting device according to the invention can be adapted in shape and size so as to tailor fit various capsule holders and capsules/pods, as long as the essential features as described above and claimed are present. For instance, it can be used with capsules used for the preparation of various beverages or even non-liquid edible products, for instance nutritional food, or baby food products, but also soups, desserts, ice-cream products.

The adapting device according to the invention can also be used with machines that prepare food at various temperature and fluid pressure. The fluid that is used is generally water—hot or cold—but it can also be another type of fluid: another liquid than water, and possibly mixed with a gas if necessary.

The different parts of the adapting device according to the invention can be manufactured in thermoplastics, metal, alloy, rubber or the like, or a combination thereof. Furthermore, it can be manufactured as one single part, or different portions can be manufactured independently and then assembled during the manufacturing process, or even delivered unassembled to the consumer who will assemble them manually. This may allow the consumer to use for instance the same adapting device body, as described above in reference to FIG. 3B, or adapt manually a bottom wall with spikes as described with reference to FIG. 8, in case a different type of capsule is to be used. This may allow a consumer to adapt different types of capsules, depending on his needs, using the same adapting device body as a common base.

Generally, the dimensions of the different parts of the adapting device are chosen so that leak-tightness is ensured at least in the upper portion of said adapting device and particularly in the interfaces between the adapting device and the fluid injection element of the machine, and also in the region of the capsule or pod outside surface, so as to guarantee that no fluid leaks:

in the space between the adapting device (and/or capsule holder) and the fluid injection element, of the machine, and
around the capsule or pod walls.

The adapting device according to the present invention can be provided to a consumer in the form of a kit of parts, the said kit comprising in the same package an adapting device as well as one or more capsules or pods of one type, or of several different types, so that the consumer can choose in the said package which capsule or pod he needs, and use it into the capsule holder of his food preparation machine by adapting the insert appropriately. In case several adapting devices are needed, to adapt to various capsule or pod configurations, the kit can comprise a series of inserts, each dedicated to one type of capsule or pod.

Generally, it should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food preparation machine for preparing a food product, the food preparation machine adapted to receive a capsule or pod holder configured to directly receive and hold at least one capsule or pod of a first kind, the food preparation machine comprising:
   a fluid injection element movable relative to the capsule or pod holder, for circulating a fluid through an internal chamber of the at least one capsule or pod of the first kind, to a discharge opening of the at least one capsule or pod of the first kind;
   at least one adapting device for adapting at least one capsule or pod of a second kind into the capsule or pod holder, the at least one capsule or pod of the second kind being smaller than the at least one capsule or pod of the first kind, the at least one adapting device comprising:
   a holding portion for holding at least a portion of the at least one capsule or pod of the second kind, wherein the holding portion contacts and holds the entire surface of side walls of the at least one capsule or pod side of the second kind, at least at the time the fluid circulates through the at least one capsule or pod of the second kind,
   a sealer for circumferentially adapting to at least one member selected from the group consisting of (i) the capsule or pod holder, (ii) the fluid injection element and (iii) a capsule outside surface, in a leak-tight manner so that the fluid is directed solely from the fluid injection element through an internal chamber of the at least one capsule or pod of the second kind, to a discharge opening of the at least one capsule or pod of the second kind, the sealer extending below a top surface of the capsule or pod holder between the capsule or pod holder and the capsule outside surface,
   a ring-like device body, an external shape and size of the ring-like device body adapted to fit at least partially an internal shape and size of the capsule or pod holder, and the internal shape and size of the capsule or pod holder adapted to fit at least partially an external surface of the at least one capsule or pod of the second kind; and
   a closing lid for closing the ring-like device body, the closing lid comprising an opening positioned relative to the fluid injection element to allow the fluid through the closing lid into the at least one capsule or pod of the second kind.

2. The food preparation machine according to claim 1, wherein the holding portion also contacts and holds the entire surface of a bottom wall of the at least one capsule or pod of the second kind, at least at the time the fluid circulates through the at least one capsule or pod of the second kind.

3. An adapting device for adapting at least one capsule or pod into a capsule holder of a food preparation machine configured to directly receive and hold native capsules originally designed for insertion into the capsule holder, the food preparation machine comprising a fluid injection element movable relative to the capsule holder for circulating a fluid through an internal chamber of the native capsules to a discharge opening of the native capsules, wherein the at least one capsule or pod is smaller than the native capsules, the adapting device comprising:
   a holding portion for holding at least a portion of the at least one capsule or pod, wherein the holding portion contacts and holds the entire surface of side walls of the at least one capsule or pod, at least at the time the fluid circulates through the at least one capsule or pod under pressure;
   a sealer for circumferentially adapting to at least one member selected from the group consisting of (i) the capsule holder, (ii) the fluid injection element of the food preparation machine and (iii) a capsule outside surface, in a leak-tight manner so that the fluid is directed solely from the fluid injection element through the internal chamber of the at least one capsule or pod to the discharge opening of the at least one capsule or pod, the sealer extending below a top surface of the capsule holder between the capsule holder and the capsule outside surface;
   a ring-like device body, an external shape and size of the ring-like device body adapted to fit at least partially an internal shape and size of the capsule holder, and the internal shape and size of the capsule holder adapted to fit at least partially an external surface of the at least one capsule or pod; and
   a closing lid for closing the ring-like device body, the closing lid comprising an opening positioned relative to the fluid injection element to allow the fluid through the closing lid into the at least one capsule or pod.

4. The adapting device according to claim 3, wherein the holding portion contacts and holds the entire surface of a bottom wall of the at least one capsule or pod, at least at the time the fluid circulates through the at least one capsule or pod.

5. The adapting device according to claim 3, wherein the closing lid further comprises a duct system comprising at least one duct in fluid communication with the opening of the closing lid and at least one outlet opening located in the vicinity of, or in contact with, the capsule or pod.

6. The adapting device according to claim 5, wherein the closing lid further comprises a sealing member to ensure that a contact surface between the ring-like device body and the closing lid is leak-tight.

7. The adapting device according to claim 6, wherein the sealing member comprises a circular O-ring rubber seal.

8. The adapting device according to claim 3 having an internal shape adapted to enclose a capsule having rigid walls with a generally cylindrical, discoid, or frustoconical shape.

9. The adapting device according to claim 3 having an internal shape adapted to enclose a soft pod having flexible walls with a generally discoid shape.

10. The adapting device according to claim 3, further comprising two cup-like complementary shells adapted to engage in the leak-tight manner so as to define together an internal chamber for enclosing the at least one capsule or pod, the two cup-like complementary shells comprising an upper shell connected to the fluid injection element in a fluid-tight manner and a lower shell comprising an outlet opening for circulating a food product produced from the circulation of the fluid through the at least one capsule or pod.

11. The adapting device according to claim 3 further comprising a lower portion in a shape of a hopper, the hopper having a shape and size such that a hopper lower outlet opening fits within a capsule holder lower dispensing opening, so that a food product flowing from the capsule or pod is directed through the hopper, out of the hopper, without contacting the capsule holder.

12. The adapting device according to claim 3 further comprising an opening member located on at least a portion of an inner surface of the adapting device, the opening member being suitable for opening at least a portion of the at least one capsule or pod to create at least one opening selected from a fluid inlet and a product dispensing outlet through the at least one capsule or pod.

13. The adapting device according to claim 3, which is single-use and disposable.

14. The adapting device according to claim 3, wherein the closing lid further comprises a plurality of outlet openings and a duct system in fluid communication with the opening and the plurality of outlet openings, wherein the plurality of outlet openings are disposed on a surface of the closing lid facing an interior of the adapting device.

* * * * *